US012621810B2

(12) United States Patent
Shabah et al.

(10) Patent No.: US 12,621,810 B2
(45) Date of Patent: May 5, 2026

(54) ASSIGNING NETWORK RESOURCES TO USER EQUIPMENT DEVICES

(71) Applicant: SOLUTIONS HUMANITAS INC., Montréal (CA)

(72) Inventors: Adbo Shabah, Montréal (CA); Mehdi Asadi, Montreal (CA); Maroua Ben Attia, Montreal (CA)

(73) Assignee: SOLUTIONS HUMANITAS INC., Montreal (CA)

( * ) Notice: Subject to any disclaimer, the term of this patent is extended or adjusted under 35 U.S.C. 154(b) by 315 days.

(21) Appl. No.: 18/535,527

(22) Filed: Dec. 11, 2023

(65) Prior Publication Data

US 2024/0357557 A1      Oct. 24, 2024

Related U.S. Application Data

(60) Provisional application No. 63/431,661, filed on Dec. 9, 2022.

(51) Int. Cl.
H04W 72/04          (2023.01)
(52) U.S. Cl.
CPC ................................... H04W 72/04 (2013.01)
(58) Field of Classification Search
CPC ...................................................... H04W 72/04
See application file for complete search history.

(56) References Cited

U.S. PATENT DOCUMENTS

| | | | |
|---|---|---|---|
| 9,420,618 B2 * | 8/2016 | Yuan-Wu ............... | H04W 28/18 |
| 2006/0205413 A1 * | 9/2006 | Teague .................. | H04L 5/0087 |
| | | | 455/450 |
| 2007/0263583 A1 * | 11/2007 | Hyon .................... | H04W 72/04 |
| | | | 370/338 |
| 2021/0160823 A1 * | 5/2021 | Cho ....................... | H04W 72/04 |

* cited by examiner

*Primary Examiner* — Nizar N Sivji
(74) *Attorney, Agent, or Firm* — Lavery, de Billy, L.L.P.; Benoit Yelle

(57) ABSTRACT

An apparatus and a related method for determining an assignment of Resource Blocks (RBs) from one or more Cell Tower (CTs) to a plurality of User Equipment devices (UEs), the assignment minimizing a total assignment cost is provided. The method includes modifying a system of equations by introducing a plurality of dummy UEs therein. The system of equations is defined using a cost matrix, a RB-Supply vector and a RB-Demand vector. The method also includes modifying the system of equations by introducing one or more dummy CTs therein and resolving the system of equations using a Customized Hungarian method. The method in addition includes reversing the modification made by introducing the dummy CTs and reversing the modification made by introducing the dummy UEs, thereby obtaining the assignment.

4 Claims, 3 Drawing Sheets

Network Node <u>2100</u>

<u>1000</u>

Preprocessing:  adding <u>1210</u> dummy UEs and adding <u>1212</u> dummy CTs in system to be solved Adapting the system to be solved to a resolution algorithm <u>1220</u>

Applying resolution algorithm to system to be solved <u>1230</u>

Postprocessing: Reversing impact of preprocessing <u>1240</u> <u>1242</u> <u>1244</u>

Validating constraints <u>1250</u>

(a)                    (b)                    (c)

(a)                    (b)                    (c)

ASSIGNING NETWORK RESOURCES TO USER EQUIPMENT DEVICES

PRIORITY STATEMENT UNDER 35 U.S.C. §.119 (E) AND 37 C.F.R. §.1.78

This non-provisional patent application claims priority based upon the prior U.S. provisional patent application entitled "ASSIGNING NETWORK RESOURCES TO USER EQUIPMENT DEVICES", application No. 63/431, 661, filed 2022 Dec. 9, in the name of Solutions Humanitas Inc, which is herein incorporated by reference in its entirety.

TECHNICAL FIELD

The present invention relates to network resource assignment to user equipment devices.

BACKGROUND

Traditional methods for assigning network resources to user equipment device are mostly based on location and signal strength.

The present disclosure aims at providing an improved solution for assigning network resources to user equipment devices considering a cost metric.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method for determining an assignment of Resource Blocks (RBs) from one or more Cell Tower (CTs) to a plurality of User Equipement devices (UEs), the assignment minimizing a total assignment cost is provided. The method includes modifying a system of equations by introducing a plurality of dummy UEs therein. The system of equations is defined using a cost matrix, a RB-Supply vector and a RB-Demand vector. The method also includes modifying the system of equations by introducing one or more dummy CTs therein and resolving the system of equations using a Customized Hungarian method. The method in addition includes reversing the modification made by introducing the dummy CTs and reversing the modification made by introducing the dummy UEs, thereby obtaining the assignment. Other embodiments of this aspect include corresponding computer systems, apparatus, and computer programs recorded on one or more computer storage devices, each configured to perform the actions of the methods.

Implementations may include one or more of the following features. The method may include, following the introduction of dummy CTs, modifying the system of equations to obtain a resolvable system. The method may include, following the reversing of the modification made by introducing the dummy UEs, verifying that the obtained assignment meets constraint of each of the UEs being assigned to one of the CTs if and only if all requirement for the RBs for any given one of the UEs are supplied by available RBs of the one of the CTs. The method may include assigning RBs from the CTs to the UEs from the obtained assignment. Implementations of the described techniques may include hardware, a method or process, or a computer tangible medium.

In one general aspect, an apparatus is provided for determining an assignment of Resource Blocks (RBs) from one or more Cell Tower (CTs) to a plurality of User Equipement devices (UEs). The apparatus includes one or more processors configured to modify a system of equations by introducing a plurality of dummy UEs therein. The system of equations is defined using a cost matrix, a RB-Supply vector and a RB-Demand vector. The one or more processors are also configured to modify the system of equations by introducing one or more dummy CTs therein and resolve the system of equations using a Customized Hungarian method. The one or more processors are also configured to reverse the modification made by introducing the dummy CTs and reverse the modification made by introducing the dummy UEs, thereby obtaining the assignment. Other embodiments of this aspect include corresponding computer systems, apparatus, and computer programs recorded on one or more computer storage devices, each configured to perform the actions of the methods.

Implementations may include one or more of the following features. The one or more processors may also be configured to, following the introduction of dummy CTs, modifying the system of equations to obtain a resolvable system. The one or more processors may also be configured to, following the reversing of the modification made by introducing the dummy UEs, verifying that the obtained assignment meets constraint of each of the UEs being assigned to one of the CTs if and only if all requirement for the RBs for any given one of the UEs are supplied by available RBs of the one of the CTs. The one or more processors may also be configured to assigning RBs from the CTs to the UEs from the obtained assignment. Implementations of the described techniques may include hardware, a method or process, or a computer tangible medium.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
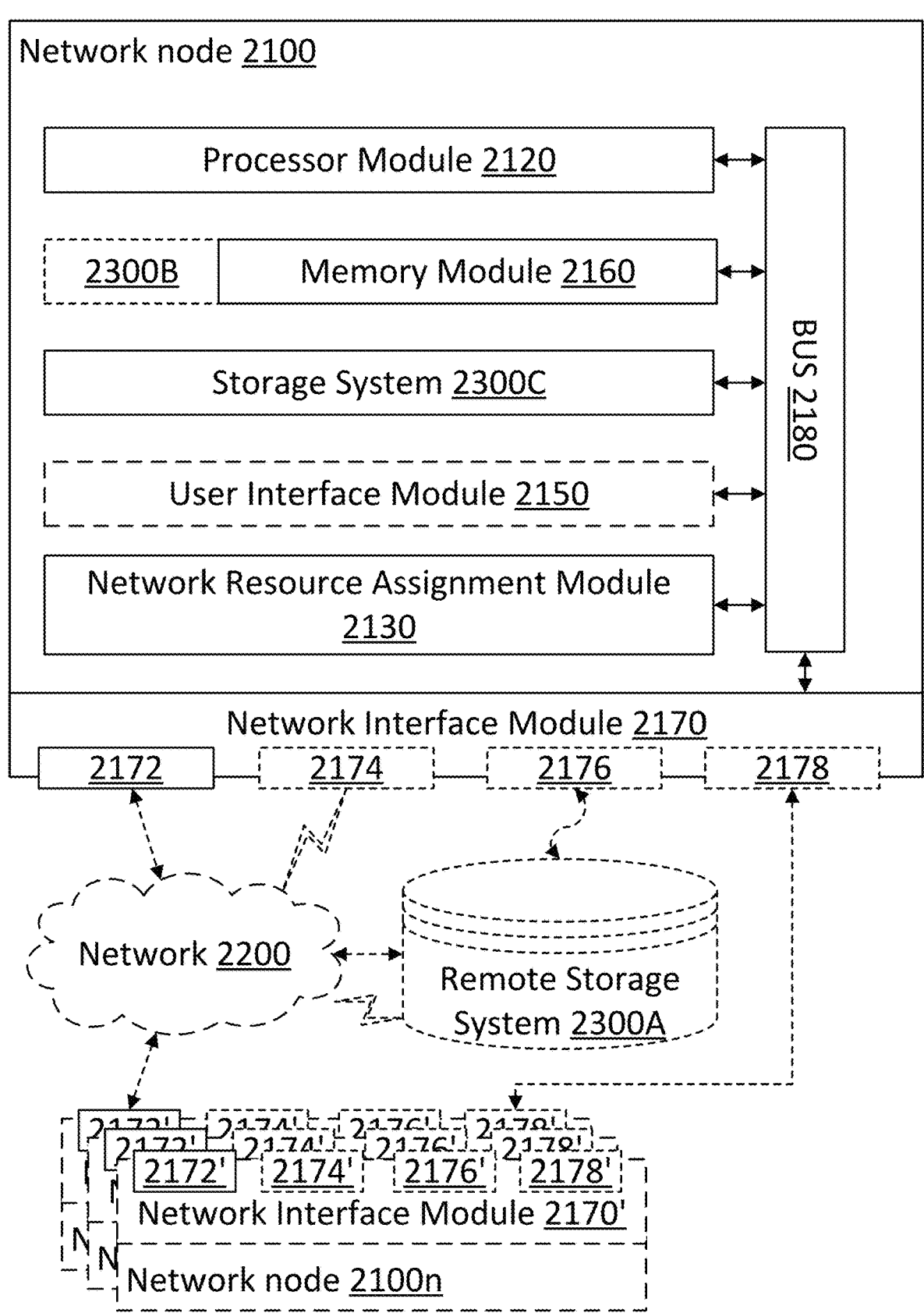
FIG. 1 is a logical modular representation of an exemplary embodiment of a network node in accordance with the teachings of the present invention.

Reference is now made to the drawings in which FIG. 1 shows a logical modular representation of an exemplary system 2000 comprising a network node 2100. The network node 2100 comprises a memory module 2160, a processor module 2120, a network resource assignment module 2130 and a network interface module 2170. The network node 2100 may also include a user interface module 2150.

The system 2000 may comprise a storage system 2300 for storing and accessing long-term (i.e., non-transitory) data and may further log data while the network node 2100 is being used. FIG. 1 shows examples of the storage system 2300 as a distinct database system 2300A, a distinct module 2300C of the network node 2100 or a sub-module 2300B of the memory module 2160 of the network node 2100. The storage system 2300 may be distributed over different systems A, B, C. The storage system 2300 may comprise one or more logical or physical as well as local or remote hard disk drive (HDD) (or an array thereof). The storage system 2300 may further comprise a local or remote database made accessible to the network node 2100 by a standardized or proprietary interface or via the network interface module 2170.

The network interface module 2170 represents at least one physical interface that can be used to communicate with other network nodes. The network interface module 2170 may be made visible to the other modules of the network node 2100 through one or more logical interfaces. The actual stacks of protocols used by the physical network interface(s) and/or logical network interface(s) 2172-2178 of the network interface module 2170 do not affect the teachings of the present invention.

The processor module 2120 may represent a single processor with one or more processor cores or an array of processors, each comprising one or more processor cores. The memory module 2160 may comprise various types of memory (different standardized or kinds of Random Access Memory (RAM) modules, memory cards, Read-Only Memory (ROM) modules, programmable ROM, etc.).

A bus 2180 is depicted as an example of means for exchanging data between the different modules of the network node 2100. The teachings presented herein are not affected by the way the different modules exchange information. For instance, the memory module 2160 and the processor module 2120 could be connected by a parallel bus, but could also be connected by a serial connection or involve an intermediate module (not shown) without affecting the teachings of the present invention.

The network resource assignment module 2130 provides resource assignment-related services to the network node 2100, which will be described in more details hereinbelow.

The variants of processor module 2120, memory module 2160 and network interface module 2170 usable in the context of the present invention will be readily apparent to persons skilled in the art. Likewise, even though explicit mentions of the network resource assignment module 2130, the memory module 2160, the user interface module 2150 and/or the processor module 2120 are not made throughout the description of the present examples, persons skilled in the art will readily recognize when such modules are used in conjunction with other modules of the network node 2100 to perform routine as well as innovative elements presented herein.

The network node 2100 may be dedicated to the network resource assignment challenge for the network 2200. In other implementations, the network node 2100 has other functions (e.g., base station or base station controller) in the network 2200. Additional network nodes 2100₁ to 2100ₙ are depicted in the example of FIG. 1 as additional or alternative points of implementation of the network resource assignment module 2130. Furthermore, an actual resource assignment may affect one or many of network nodes 2100, 2100₁ to 2100ₙ.

The following sections provide examples of implementations of the network resource assignment challenge in the form of a min-sum assignment for user equipment devices with regards to resources available from cell towers. Skilled persons will readily undertsand that the reference to User Equipment devices (UEs), Resource Bolcks (RBs) and Cell Towers (CTs) is made for ease of reference and that other terminologies may be used (e.g., considering a given deployment standard) without affecting the teachings found herein. Likewise, a definition of cost of assignment of RBs to UEs from CTs is dependent on the context of deployment and may be expressed any given manner relevant thereto.

While the present invention refers to Cell tower Transmission to UE, it is implied that the invention applies to any "serving node" serving any "served node". In some cases, the node might have both capabilities within.

Figures 2, 3:
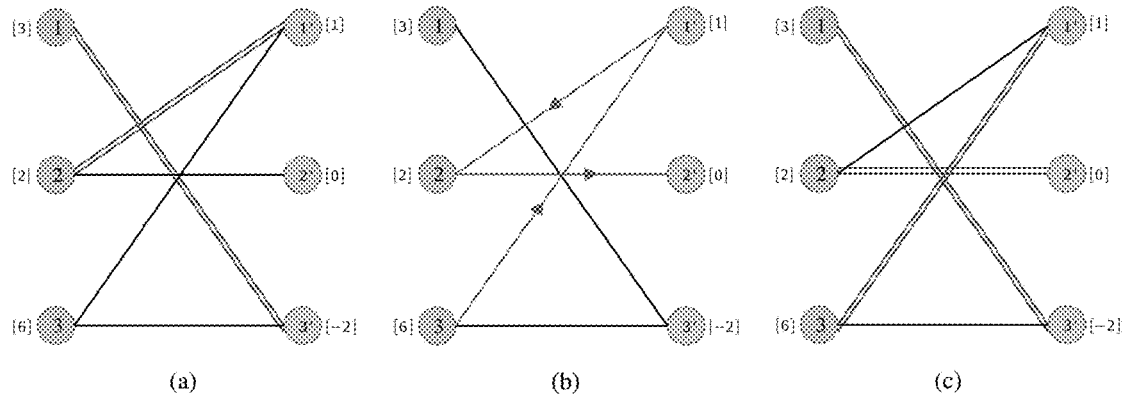
FIG. 2 is a state diagram representation of a method for determining an assignment of Resource Blocks (RBs) in accordance with the teachings of the present invention.
FIG. 3 is a nodal representation of a Reduced Bipartite graph in accordance with the teachings of the present invention.

FIG. 2 depicts an example of a method 1000 (e.g., executed in the network node 2100) for determining an assignment of Resource Blocks (RBs) from one or more Cell Tower (CTs) to a plurality of User Equipement devices (UEs), the assignment minimizing a total assignment cost. the method 1000 comprises preprocessing steps of modifying a system of equations by introducing 1210 a plurality of dummy UEs and modifying the system of equations by introducing 1212 one or more dummy CTs therein. The system of equations being defined using a cost matrix, a RB-Supply vector and a RB-Demand vector. The method 1000 also comprises resolving 1230 the system of equations using a Customized Hungarian method beofre applying postprocessing steps of reversing 1240 the modification made by introducing the dummy CTs and reversing 1242 the modification made by introducing the dummy UEs, thereby obtaining the assignment. The method 1000 may further comprise, following the introduction of dummy CTs, modifying the system of equations to obtain a resolvable system. The method 1000 may further comprisise following the reversing of the modification made by introducing 1210 the dummy UEs, verifying that the obtained assignment meets constraint of each of the UEs being assigned to one of the CTs if and only if all requirement for the RBs for any given one of the UEs are supplied by available RBs of the one of the CTs. The method 1000 may further comprise assigning RBs from the CTs to the UEs from the obtained assignment.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

I. APPENDIX—GENERIC MIN-SUM ASSIGNMENT CHALLENGE

Consider the Agent-Task Assignment challenge consisting of m agents versus n tasks. Define $\mathcal{A}$ and $\mathcal{B}$ as the index sets of tasks and agents such that $n=|\mathcal{A}|$ and $m=|\mathcal{B}|$. Define $c=[c_j]$ as the Resource-Block-Supply vector whose element $c_j$ denotes the maximum number of resource-blocks that agent j is able to provide in order to address the tasks at a given time instant, for any $j\in\mathcal{B}$. Moreover, define $d=[d_i]$ as the Resource-Block-Demand vector whose element $d_i$ denotes the number of resource-blocks that task i demands in order to get fully addressed by an agent, for any $i\in\mathcal{A}$. Let $T=[t_{ij}]$ be defined as the cost matrix where $t_{ij}$ denotes the cost of assigning the $i^{th}$ task to be performed by the $j^{th}$ agent such that agent j uses only one of its resource-blocks to supply only one resource-block demand of task i, for any $i\in\mathcal{A}$ and $j\in\mathcal{B}$. By defining the binary matrix $X=[x_{ij}]\in\{0,1\}^{n\times m}$ as the decision matrix, the $i^{th}$ task is assigned to the $j^{th}$ agent through supplying all $d_i$ resource-blocks of task i by agent j when $x_{ij}=1$, and $x_{ij}=0$ otherwise. The objective is to find the optimal solution to Agent-Task Assignment challenge such that the total cost of agent-task assignment is minimized subject to a number of constraints. This challenge is then formulated as an optimization problem as follows $$\min \sum_{j\in\mathcal{B}}\left(\sum_{i\in\mathcal{A}}d_i t_{ij}x_{ij}\right) \qquad (1a)$$

$$\text{subject to } \sum_{j\in\mathcal{B}}x_{ij}\leq 1, \quad \forall\, i\in\mathcal{A}, \qquad (1b)$$

$$\sum_{i\in\mathcal{A}}d_i x_{ij}\leq c_j, \quad \forall\, j\in\mathcal{B}, \qquad (1c)$$

$$x_{ij}\in\{0,1\}, \quad \forall\, i\in\mathcal{A}, j\in\mathcal{B}. \qquad (1d)$$

Note that the first constraint in (1b) indicates that all $d_i$ demands of the resource-blocks for the $i^{th}$ task should be provided by at most one single agent, for any $i\in\mathcal{A}$. Moreover, the second constraint in (1c) indicates that any agent j is capable of supplying at most $c_j$ resource-blocks for the tasks in the problem, for any $j\in\mathcal{B}$. This constraint excludes the scenario where more than one agent are assigned to supply resource-block demands of a single task by labeling it as an invalid assignment. Note also that $d_i$, which describes the number of resource-block demands of the $i^{th}$ task, appears as a coefficient in the cost function formulation in (1a). Cost function is defined as the summation of cost of all assigned agent-task pairs such that the resource-block demand of the $i^{th}$ task (i.e. $d_i$) appears as a coefficient.

Let also define $$\bar{c} := \sum_{j=1}^{m} c_j$$

and $$\bar{d} := \sum_{i=1}^{n} d_i$$

as the Total Resource-Block Supply provided by all the agents and the Total Resource-Block Demand requested by all the tasks, respectively. Depending on the values of scalars $\bar{c}$ and $\bar{d}$, we encounter three different scenarios including:

Resource-Block Surplus scenario for which $\bar{c}>\bar{d}$,

Resource-Block Deficit scenario for which $\bar{c}<\bar{d}$, and

Standard scenario for which $\bar{c}=\bar{d}$.

The optimal assignment method is then developed to be capable of solving (1) in all the three aforementioned scenarios.

The proposed method starts by execution of the First Pre-Processing step in which a number of dummy tasks are introduced into the problem in order to represent the requirement of $d_i$ resource-blocks for full accomplishment of each task i. To this end, the index set $\mathcal{A}$ and cost matrix T are replaced with $\bar{\mathcal{A}}$ and $\tilde{T}$, respectively. Afterwards, the Second Pre-Processing step is performed by introducing dummy agents into the problem. The dummy agents are used to implement the impact of $c_j$ resource-blocks supplied by each agent j. To this end, the index set $\mathcal{B}$ and cost matrix $\tilde{T}$ are replaced with $\bar{\mathcal{B}}$ and $\bar{T}$, respectively. The Third Pre-Processing step is then used to make the formulation of the problem compatible with the scenarios of Resource-Block Surplus, Resource-Block Deficit and Standard. To this end, the index sets $\bar{\mathcal{A}}$, $\bar{\mathcal{B}}$ and cost matrix $\bar{T}$ are replaced with $\hat{\mathcal{A}}$, $\hat{\mathcal{B}}$ and $\hat{T}$, respectively, through introduction of additional dummy tasks or dummy agents as well as addition of either zero rows or zero columns of appropriate sizes to the weight matrix. Then, we run a customized version of the Hungarian algorithm to solve the Min-Sum Assignment (MSA) challenge. The customization part is used in order to end up with a valid assignment $\hat{M}^*$ at the end of the optimization through exclusion of all the invalid assignments. More specifically, an assignment could become invalid in this stage if the resource-block demand of a certain task i is provided by more than one agent j, resulting in shared supply of the $i^{th}$ task's demands by more than one agent (violation of constraint (1b)). The innovations of this steps are realized through establishing a new method to find the Augmenting-Path in the process of Hungarian algorithm. The First Post-Processing step is then implemented to reverse the previous changes made in the Third Pre-Processing step which results in the modified optimal assignment $\bar{M}^*$ at the end. The Second Post-Processing step is used to reverse the previous changes made in the Second Pre-Processing step by replacing the index of dummy agents with real agents, resulting in the optimal assignment $\tilde{M}^*$. Finally, the Third Post-Processing step is utilized to reverse the modifications made in the First Pre-Processing step through replacing the index of dummy tasks with real tasks, resulting in the final optimal assignment M*.

Brief Description of the Pre/Post-Processing Steps

In order to solve the presented Agent-Task Assignment challenge and given the values of n, m, T, c and d as inputs, we reformulate the problem based on the values of RB-Supply vector c, RB-Demand vector d, Total RB Supply $\bar{c}$ and Total RB Demand $\bar{d}$ through introduction of dummy agents and dummy tasks into the problem. After this transformation, we check whether we are in the RB Surplus ($\bar{c}>\bar{d}$), RB Deficit ($\bar{c}<\bar{d}$) or Standard ($\bar{c}=\bar{d}$) scenarios. In Standard scenario, we take no further action. However, we experience excess of RBs supplied by the agents compared to the RB demand by the tasks in RB Surplus scenario, while we are facing a shortage in supply of RBs provided by the agents compared to the demand of RBs requested by the tasks in RB Deficit scenario. The objective is to end up with a transformed cost matrix with equal number of rows and columns at the end of this step. This objective is then achieved through addition of appropriate number of zero row vectors or zero column vectors to the cost matrix, resulting in the desired outcome at the end.

A customized version of Hungarian algorithm is then employed to solve the MSA challenge, resulting in the Customized Hungarian method to solve the previously-described challenge. More specifically, this method works based on the Primal-Dual approach to tackle the MSA optimization problem. To this end, the method starts with an infeasible solution of the primal-version along with a feasible solution of the dual-version. Then, the iterations of the main while-loop moves forward by increasing the value of dual cost function which in turn results in reducing the value of the primal cost function, while satisfying the Complementary Slackness condition at every iteration of the main while-loop. Once the solution of the primal-version becomes feasible, it is guaranteed that the primal-version of the optimization problem has reached its minimum value while the dual-version has reached its maximum at the same time, signifying the termination condition of the optimization. Thus, the main while-loop of the Hungarian algorithm continues its iterations as long as the index set of Free Dummy Agents is non-empty. Note that the emptiness of this index set indicates that the primal solution has become feasible, which guarantees the convergence to the optimal solution. In each iteration of the main while-loop, it is required to search for an Augmenting-Path for which a Depth-First Search (DFS) procedure is used in this work to perform the search. However, the desired Augmenting-Path should be appropriately searched for such that the constraint (1b) of the optimization problem is respected at the same time. Satisfying this constraint calls for necessary modifications in the traditional DFS-based procedure used for finding Augmenting-Path, which is not considered in the traditional Hungarian algorithm. Satisfaction of this requirement calls for an improved version of the Hungarian algorithm which is called the Customized Hungarian method.

Once a valid optimal assignment is obtained by implementation of the Customized Hungarian method for the transformed Agent-Task Assignment challenge, we need to reverse the impact of the transformations made in the three pre-processing steps so that the optimal assignment provides a solution of the original Agent-Task Assignment challenge. This objective is achieved by first reversing the transformation done to equalize the number of rows and columns of the cost matrix. After that, the indices of dummy agents and dummy tasks are replaced with the indices of real agents and real tasks, respectively. all these actions are done in form of three post-processing steps which at the end result in the optimal solution for the original Agent-Task Assignment challenge.

II. APPENDIX—NEW METHOD TO SOLVE MIN-SUM ASSIGNMENT FOR UE-CT APPLICATION

Let assume we have n User Equipments (UEs), m Cell Towers (CTs), the Cost Matrix $T=[t_{ij}]\in \mathbb{R}^{n\times m}$, the Resource-Block (RB)-Supply vector $c=[c_j]$ and the Resource-Block (RB)-Demand vector $d=[d_i]$ as inputs of the method. By considering $\mathcal{A}$ and $\mathcal{B}$ as the index sets of UEs and CTs, respectively, let define $$\bar{c} := \sum_{j=1}^{m} c_j$$

and $$\bar{d} := \sum_{i=1}^{n} d_i$$

as the Total RB Supply and Total RB Demand, respectively. The quality of the communication channel for connecting $i^{th}$ UE to $j^{th}$ CT is quantified in terms of the RBs needed to establish this channel, for any $i\in \mathcal{A}$ and $j\in \mathcal{B}$.

To formulate the Agent-Task Assignment challenge for the UE-CT Assignment application, the RB-Supply vector $c=[c_j]$ is defined to quantify the RB supply provided by each CT to establish the communication channels between UEs and CTs. In addition, the RB-Demand vector $d=[d_i]$ is defined as another vector where $d_i$ denotes the number of RBs required to establish a communication channel from $i^{th}$ UE to any of the CTs. Define $T=[t_{ij}]$ as the Cost Matrix where $t_{ij}$ denotes the cost of establishing a communication channel from $i^{th}$ UE to $j^{th}$ CT through supplying a single RB demand of $i^{th}$ UE by the $j^{th}$ CT, for any $i\in \mathcal{A}$ and $j\in \mathcal{B}$. Note that the $i^{th}$ UE is successfully assigned to the $j^{th}$ CT only if all $d_i$ RBs demanded by the $i^{th}$ UE are simultaneously supplied by the $j^{th}$ CT while the total number of RBs supplied by the $j^{th}$ CT to all UEs is not surpassing $c_j$.

Definition 1: The $j^{th}$ CT can supply at most $c_j$ RBs for the RB demands of different UEs, forming the $j^{th}$ element of the RB-Supply vector c.

Definition 2: The $i^{th}$ UE requires $d_i$ RBs for its successful assignment, which is given as the $i^{th}$ element of the RB-Demand vector d.

Definition 3: The $i^{th}$ UE is assigned to the $j^{th}$ CT if and only if all the $d_i$ demands for resource blocks (RBs) of the $i^{th}$ UE are supplied by the available resource blocks (RBs) of the $j^{th}$ CT.

The objective is to find the optimal assignment vector $M^*=[m^*_i]$ which minimizes the total assignment cost by using the available supplies of RBs as much as possible. A new method to solve this optimization problem is then proposed, whose detailed steps are provided as follows:

1) method starts by performing the First Pre-Processing step where UE index set $\mathcal{A}$ and cost matrix $T\in \mathbb{R}^{n\times m}$ are replaced with $\tilde{\mathcal{A}}$ and $\tilde{T}\in \mathbb{R}^{\tilde{d}\times m}$, respectively, through introduction of Dummy UEs into the problem. To this end, $$\tilde{\mathcal{A}} = \bigcup_{i=1}^{n}\left\{1 + \sum_{k=1}^{i-1}d_k, 2 + \sum_{k=1}^{i-1}d_k, \ldots, d_i + \sum_{k=1}^{i-1}d_k\right\} \quad (2a)$$

$$\tilde{T} = [\underbrace{t_{1}^{\top}\ldots t_{1}^{\top}}_{d_1}, \underbrace{t_{2}^{\top}\ldots t_{2}^{\top}}_{d_2}, \ldots \underbrace{t_{n}^{\top}\ldots t_{n}^{\top}}_{d_n}]^{\top} \quad (2b)$$

2) Second Pre-Processing step is then performed by replacing CT index set $\mathcal{B}$ and cost matrix $\tilde{T}$ with $\bar{\mathcal{B}}$ and $\bar{T}\in \mathbb{R}^{\bar{d}\times\bar{c}}$, respectively, through introduction of Dummy CTs into the problem, such that $$\bar{\mathcal{B}} = \bigcup_{i=1}^{m}\left\{1 + \sum_{k=1}^{j-1}c_k, 2 + \sum_{k=1}^{j-1}c_k, \ldots, c_j + \sum_{k=1}^{j-1}c_k\right\} \quad (3a)$$

$$\bar{T} = [\underbrace{\bar{t}_{:1}\ldots\bar{t}_{:1}}_{c_1}\underbrace{\bar{t}_{:2}\ldots\bar{t}_{:2}}_{c_2}\ldots\underbrace{\bar{t}_{:m}\ldots\bar{t}_{:m}}_{c_m}] \quad (3b)$$

3) Third Pre-Processing step is followed by comparing the values of $\bar{c}$ and $\bar{d}$. In this step, we are facing a scenario of RB Surplus ($\bar{c}>\bar{d}$) or RB Deficit ($\bar{c}<\bar{d}$) or Standard ($\bar{c}=\bar{d}$). By defining $\bar{r}:=\max\{\bar{c},\bar{d}\}$, the cost matrix $\bar{T}$ and index sets $\bar{\mathcal{A}}$ and $\bar{\mathcal{B}}$ are replaced with the cost matrix $\hat{T}\in\mathbb{R}^{\bar{r}\times\bar{r}}$ as well as index sets $\hat{\mathcal{A}}$ and $\hat{\mathcal{B}}$, respectively, as follows $$\hat{T} = \begin{cases} [\bar{T}^{\top} \underbrace{0_{\bar{c}\times1}\ldots 0_{\bar{c}\times1}}_{\bar{s}}]^{\top} & \text{if } \bar{c}>\bar{d} \\ \bar{T} & \text{if } \bar{c}=\bar{d} \\ [\bar{T}\underbrace{0_{\bar{d}\times1}\ldots 0_{\bar{d}\times1}}_{\bar{s}}] & \text{if } \bar{c}<\bar{d} \end{cases} \quad \bar{s}=\begin{cases}\bar{c}-\bar{d} & \text{if }\bar{c}>\bar{d}\\0 & \text{if }\bar{c}=\bar{d}\\\bar{d}-\bar{c} & \text{if }\bar{c}<\bar{d}\end{cases} \quad (4a)$$

$$\hat{\mathcal{A}} = \begin{cases}\bar{\mathcal{A}}\cup\{\bar{d}+1,\bar{d}+2,\ldots,\bar{r}\} & \text{if }\bar{c}>\bar{d}\\\bar{\mathcal{A}} & \text{if }\bar{c}\le\bar{d}\end{cases}\hat{\mathcal{B}}=\begin{cases}\bar{\mathcal{B}} & \text{if }\bar{c}\ge\bar{d}\\\bar{\mathcal{B}}\cup\{\bar{c}+1,\bar{c}+2,\ldots,\bar{r}\} & \text{if }\bar{c}<\bar{d}\end{cases} \quad (4b)$$

4) The final transformed version of Min-Sum Assignment challenge with index sets $\hat{\mathcal{A}}$ and $\hat{\mathcal{B}}$ and cost matrix $\hat{T}$ is solved using Customized Hungarian method with a procedure based on Depth-First Search to look for the Augmenting-Path inside the main while-loop of the method. More specifically, this method contains a new procedure in order to search for the Augmenting-Path which results in a valid assignment satisfying constraints (1b) and (1c) at the same time. At the end, the optimal assignment vector $\hat{M}^*\in\hat{\mathcal{B}}^{\bar{r}}$ is generated by the Customized Hungarian method.

5) First Post-Processing step is performed by reversing the transformations made in Third Pre-Processing step which results in optimal assignment vector $\bar{M}^*\in(\bar{\mathcal{B}}\cup\{0\})^{\bar{c}}$, such that $$\bar{M}^* = \begin{cases}\hat{M}^*|\hat{m}_i^*=0\forall i\in\hat{\mathcal{A}}\backslash\bar{\mathcal{A}} & \text{if }\bar{c}>\bar{d}\\\hat{M}^* & \text{if }\bar{c}=\bar{d}\\[\hat{m}_1^*\hat{m}_2^*\ldots\hat{m}_{\bar{c}}^*] & \text{if }\bar{c}<\bar{d}\end{cases} \quad (5)$$

6) Second Post-Processing step is performed by reversing the transformations performed in Second Pre-Processing step which results in optimal assignment vector $\tilde{M}^*\in(\mathcal{B}\cup\{0\})^{\bar{c}}$, such that $$\tilde{M}^* = [\tilde{m}_i^*] \quad (6a)$$

$$\tilde{m}_i^* = \begin{cases}j\in\mathcal{B}\Big|\sum_{k=1}^{j-1}c_k<\bar{m}_i^*\le\sum_{k=1}^{j}c_k & \text{if }\bar{m}_i^*\ne0\\0 & \text{if }\bar{m}_i^*=0\end{cases}, \forall i\in\bar{\mathcal{A}} \quad (6b)$$

7) Third Post-Processing step is performed by reversing the transformations made in First Pre-Processing step which results in optimal assignment vector $M^*\in(\mathcal{B}\cup\{0\})^n$, such that $$M^* = [m_i^*] \quad (7a)$$

$$m_i^* = \begin{cases}j & \text{if }\left(\tilde{m}_{\sum_{k=1}^{i-1}d_k+1}^*=j\right)\wedge\left(\tilde{m}_{\sum_{k=1}^{i-1}d_k+2}^*=j\right)\wedge\ldots\wedge\left(\tilde{m}_{\sum_{k=1}^{i-1}d_k+d_i}^*=j\right)\\0 & \text{if Otherwise}\end{cases}, \forall i\in\mathcal{A} \quad (7b)$$

A more detailed description of the proposed method is provided in pseudo-code form in Algorithms 1 and 2.

Customized Hungarian Method to Solve Min-Sum Assignment for UE-CT Application

Inputs to the method: Cost matrix $\hat{T}=[\hat{t}_{ij}]\in\mathbb{R}^{\bar{r}\times\bar{r}}$ where $\bar{r}:=\max\{\bar{c},\bar{d}\}$, UE index set $\hat{\mathcal{A}}$, CT index set $\hat{\mathcal{B}}$
Output of the method: Optimal assignment vector $\hat{M}^*=[\hat{m}^*_i]\in\hat{\mathcal{B}}^{\bar{r}}$ After preforming the previously-explained three pre-processing steps, we are dealing with a balanced M S A challenge. The Customized Hungarian method starts with an Initialization step at the beginning where Dual-Pair $\{u(1)=[u_i(1)], v(1)=[v_j(1)]\}$, Reduced Cost Matrix $\check{T}=[\check{t}_{ij}]\in\mathbb{R}^{\bar{r}\times\bar{r}}$, assignment vector $\check{M}(1)=[\check{m}_i(1)]$ and the index set of Free Dummy UEs $\check{\mathcal{A}}(1)$ are initialized as follows $$u_i(0)\leftarrow\min_{j\in\hat{\mathcal{B}}}\hat{t}_{ij}, \forall i\in\hat{\mathcal{A}} \quad (8a)$$

$$v_j(0)\leftarrow\min_{i\in\hat{\mathcal{A}}}[\hat{t}_{ij}-u_i(0)], \forall j\in\hat{\mathcal{B}} \quad (8b)$$

$$\check{t}_{ij}(0)\leftarrow\hat{t}_{ij}-u_i(0)-v_j(0), \forall i\in\hat{\mathcal{A}}, j\in\hat{\mathcal{B}} \quad (8c)$$

$$\check{m}_i(0)\leftarrow\begin{cases}j, & \text{if }\exists j\in\hat{\mathcal{B}}\big|\check{t}_{ij}(0)=0\wedge(j\ne\check{m}_k(0)\forall k\in\mathbb{N}_{i-1})\\0, & \text{if }\nexists j\in\hat{\mathcal{B}}\big|\check{t}_{ij}(0)=0\wedge(j\ne\check{m}_k(0)\forall k\in\mathbb{N}_{i-1})\end{cases} \quad (8d)$$

$$\check{\mathcal{A}}(0)\leftarrow\{i\in\hat{\mathcal{A}}|\check{m}_i(0)=0\} \quad (8e)$$

After finalizing the initialization step, the main while-loop of the method with iteration index 1 starts where the $1^{th}$ iteration is implemented as long as the index set of Free Dummy UEs $\check{\mathcal{A}}(1)$ is non-empty. Afterwards, the Free Dummy UE index i*(1) is chosen as an arbitrary element of the non-empty index set $\check{\mathcal{A}}(1)$.

The next objective is to find an Augmenting-Path $\mathcal{F}(l)$ which starts from i*(l) and ends in any Free Dummy CT belonging to the index set $\hat{\mathcal{B}}$. To this end, an inner while-loop with iteration index p, which is embedded inside the main while-loop, is invoked. By setting p←0 and initializing the binary variable P as true, the inner while-loop is executed as long as P remains true. Let $\mathcal{S}_u$, $\mathcal{L}_v$ and $\mathcal{S}_v$ be defined as the index sets of Scanned UEs, Labeled CTs and Scanned CTs, respectively. Assume that the obtained Augmenting-Path is saved inside a set $\bar{\mathcal{P}}$, while two LIFO Stacks of $C_1$ and $C_2$ are used in the process of search for the desired Augmenting-Path inspired by the Depth-First Search (DFS) method. The introduced sets are then initialized as follows $$S_u \leftarrow \emptyset, \mathcal{L}_v \leftarrow \emptyset, S_v \leftarrow \emptyset, \bar{\mathcal{P}} \leftarrow \emptyset, C_1 \leftarrow \emptyset, C_2 \leftarrow \emptyset \qquad (9)$$

The Intermediate Dummy UE index s(p) and the Intermediate Dual-Pair $\{\bar{u}=[\bar{u}_i], \bar{v}=[\bar{v}_j]\}$ for the inner while-loop are then initialized by setting $$s(0) \leftarrow i^*(l), \bar{u} \leftarrow u(l), \bar{v} \leftarrow v(l) \qquad (10)$$

By entering the inner while-loop, the set of Scanned UEs $\mathcal{S}_u$ is updated first at the $p^{th}$ iteration, while the Intermediate Reduced Cost Matrix $R=[r_{ij}] \in \mathbb{R}^{\bar{r} \times \bar{r}}$ and the Intermediate Dummy CT index t(p) are evaluated as follows $$S_u \leftarrow S_u \cup \{s(p)\} \qquad (11a)$$

$$r_{ij} \leftarrow \hat{t}_{ij} - \bar{u}_i - \bar{v}_j \qquad (11b)$$

$$t(p) \leftarrow \{j \in \hat{\mathcal{B}} \setminus \mathcal{L}_v | r_{s(p),j} = 0\} \qquad (11c)$$

for any $i \in \hat{\mathcal{A}}$ and $j \in \hat{\mathcal{B}}$. In case t(p) exists, the following updates of the sets $\mathcal{L}_v$, $C_1$, and $C_2$ then take place $$\mathcal{L}_v \leftarrow \mathcal{L}_v \cup \{t(p)\} \qquad (12a)$$

$$C_1 \leftarrow C_1 \cup \{s(p)\} \qquad (12b)$$

$$C_2 \leftarrow C_2 \cup \{t(p)\} \qquad (12c)$$

By checking the emptiness of the index set $\mathcal{L}_v \setminus \mathcal{S}_v$ as well as the LIFO Stack $C_1$, one of the following four different cases can occur in every iteration p of the inner while-loop
1) DPU (dual-pair update): it occurs when $\mathcal{L}_v \setminus \mathcal{S}_v = \emptyset$ and $C_1 = \emptyset$
2) BTR (backtracking): it occurs when $\mathcal{L}_v \setminus \mathcal{S}_v = \emptyset$ and $C_1 \neq \emptyset$
3) FWD (moving forward): it occurs when $\mathcal{L}_v \setminus \mathcal{S}_v \neq \emptyset$ and $\exists i \in \hat{\mathcal{A}} | \check{m}_i(l) = t(p)$
4) APF (augmenting-path found): it occurs when $\mathcal{L}_v \setminus \mathcal{S}_v \neq \emptyset$ and $\nexists i \in \hat{\mathcal{A}} | \check{m}_i(l) = t(p)$
If DPU case happens, the following updates take place $$\delta \leftarrow \min_{i \in S_u, j \in \hat{\mathcal{B}} \setminus \mathcal{L}_v} r_{ij}, \qquad (13a)$$

$$\bar{u}_i \leftarrow \bar{u}_i + \delta, \forall i \in S_u, \qquad (13b)$$

-continued $$\bar{v}_j \leftarrow \bar{v}_j - \delta, \forall j \in \mathcal{L}_v, \qquad (13c)$$

$$s(p+1) \leftarrow i^*(l), S_u \leftarrow \emptyset, \mathcal{L}_v \leftarrow \emptyset, S_v \leftarrow \emptyset, \bar{\mathcal{P}} \leftarrow \emptyset \qquad (13d)$$

If BTR case happens, the following updates are implemented $$x \leftarrow LIFO(C_1), C_1 \leftarrow C_1 \setminus \{x\} \qquad (14a)$$

$$y \leftarrow LIFO(C_2), C_2 \leftarrow C_2(p) \setminus \{y\} \qquad (14b)$$

$$s(p+1) \leftarrow x, \bar{\mathcal{P}} \leftarrow \bar{\mathcal{P}} \setminus \{(x, y), (y, \{i \in \hat{\mathcal{A}} | \check{m}_i(l) = y\})\} \qquad (14c)$$

If FWD case happens, the following updates are implemented $$S_v \leftarrow S_v \cup \{t(p)\} \qquad (15a)$$

$$s(p+1) \leftarrow \{i \in \hat{\mathcal{A}} | \check{m}_i(l) = t(p)\} \qquad (15b)$$

$$\bar{\mathcal{P}} \leftarrow \bar{\mathcal{P}} \cup \{(s(p), t(p)), (t(p)\{i \in \hat{\mathcal{A}} | \check{m}_i(l) = t(p)\})\} \qquad (15c)$$

If APF case occurs, the following updates happen $$S_v \leftarrow S_v \cup \{t(p)\}, s(p+1) \leftarrow s(p) \qquad (16a)$$

$$\bar{\mathcal{P}} \leftarrow \bar{\mathcal{P}} \cup \{(s(p), t(p))\}, P \leftarrow \text{false} \qquad (16b)$$

The iterations of the inner while-loop continues by setting p←p+1 until P obtains a false value. This concludes the description of the inner while-loop by setting $\mathcal{F}(l) \leftarrow \bar{\mathcal{P}}$. By returning back to the main while-loop, the following updates for Dual-Pair vectors {u(l+1), v(l+1)}, Reduced Cost Matrix $\check{T}(l+1)$, Assignment vector $\check{M}(l+1)$, and Free Dummy UEs set $\hat{\mathcal{A}}(l+1)$ are implemented $$\{u(l+1), v(l+1)\} \leftarrow \{\bar{u}, \bar{v}\} \qquad (17a)$$

$$\check{T}(l+1) \leftarrow R \qquad (17b)$$

$$\check{m}_i(l+1) \leftarrow \begin{cases} j & \text{if } \exists j \in \hat{\mathcal{B}} | (i, j) \in \mathcal{P}(l) \\ \check{m}_i(l) & \text{if } \nexists j \in \hat{\mathcal{B}} | (i, j) \in \mathcal{P}(l) \end{cases} \forall i \in \hat{\mathcal{A}} \qquad (17c)$$

$$\hat{\mathcal{A}}(l+1) \leftarrow \{i \in \hat{\mathcal{A}} | \check{m}_i(l+1) = 0\} \qquad (17d)$$

Note that $\hat{\mathcal{A}}(l+1) \neq \emptyset$ holds as long as $\check{M}(l+1)$ does not have its maximum cardinality. The iterations of the main while-loop continues by setting l←l+1 until the index set $\hat{\mathcal{A}}(l+1)$ becomes empty. At the end, the optimal assignment vector $\hat{M}^*$ is evaluated by setting $\hat{M}^* \leftarrow \check{M}(l)$.

---

Algorithm 1 Customized Hungarian method to solve MSA

---

Input: $\mathcal{A}$, $\mathcal{B}$, T = [t$_{ij}$], c = [c$_j$], d = [d$_i$]
Output: $\hat{M}^* = [\hat{m}_i^*]$
  1: First pre-processing step by generating $\tilde{\mathcal{A}}$ and $\tilde{T}$ out of $\mathcal{A}$ and T using (2)
  2: Second pre-processing step by generating $\bar{\mathcal{B}}$ and $\bar{T}$ out of $\mathcal{B}$ and $\tilde{T}$ using (3)
  3: Third pre-processing step by generating $\hat{\mathcal{A}}$, $\hat{\mathcal{B}}$, $\hat{T}$ out of $\tilde{\mathcal{A}}$, $\bar{\mathcal{B}}$, $\bar{T}$ using (4)
  4: Set l $\leftarrow$ 0, and initialize {u(0), v(0)}, $\check{T}(0)$, $\check{\mathcal{G}}(0)$, $\check{M}(0)$, $\check{\mathcal{A}}(0)$ using equation (8)
  5: while $\check{\mathcal{A}}(l) \neq \emptyset$ do
  6:    Choose selected UE i*(l) out of the index set $\check{\mathcal{A}}(l)$
  7:    Generate $\mathcal{P}(l)$ using the sub-procedure AugPath(i*(l), $\hat{T}$, {u(l), v(l)}, $\check{M}(l)$)
  8:    Obtain updated values of {u(l+1), v(l+1)}, $\check{T}(l+1)$, $\check{M}(l+1)$, $\check{\mathcal{A}}(l+1)$ using equation (17)
  9:    Set l $\leftarrow$ l + 1
 10: end while
 11: $\hat{M}^* \leftarrow \check{M}(l)$
 12: First post-processing step by generating $\overline{M}^*$ out of $\hat{M}^*$ using (5)
 13: Second post-processing step by generating $\tilde{M}^*$ out of $\overline{M}^*$ using (6)
 14: Third post-processing step by generating M* from $\tilde{M}^*$ as the optimal assignment using (7)

---

Algorithm 2 Sub-procedure AugPath(·) as a component of Customized Hungarian method

---

Inputs: i*(l), $\hat{T}$, u(l), v(l), $\check{M}(l)$
Output: $\mathcal{P}(l)$
  1: Set p $\leftarrow$ 0, P $\leftarrow$ true, and initialize $S_u$, $\mathcal{L}_v$, $S_v$, $\bar{\mathcal{P}}$, $C_1$, $C_2$ using equation (9)
  2: Initialize values of s(0), $\bar{u}$, $\bar{v}$ using equation (10)
  3: while P = true do
  4:    Update $S_u$ and compute R = [$r_{ij}$] and t(p) using equation (11)
  5:    Update values of $\mathcal{L}_v$, $C_1$ and $C_2$ using (12) if t(p) exists
  6:    if $\mathcal{L}_v \backslash S_v = \emptyset \wedge C_1 = \emptyset$ then
  7:       Update values of $\bar{u}$, $\bar{v}$, s(p + 1), $S_u$, $\mathcal{L}_v$, $S_v$ and $\bar{\mathcal{P}}$ using (13)
  8:    else if $\mathcal{L}_v \backslash S_v = \emptyset \wedge C_1 = \emptyset$ then
  9:       Update values of $C_1$, $C_2$, s(p + 1) and $\bar{\mathcal{P}}$ using (14)
 10:    else if $\mathcal{L}_v \backslash S_v \neq \emptyset \wedge \exists i \in \check{\mathcal{A}} | \check{m}_i(l) = t(p)$ then
 11:       Update values of $S_v$, s(p + 1) and $\bar{\mathcal{P}}$ using (15)
 12:    else if $\mathcal{L}_v \backslash S_v \neq \emptyset \wedge \nexists\ i \in \check{\mathcal{A}} | \check{m}_i(l) = t(p)$ then
 13:       Update values of $S_v$, s(p + 1), $\bar{\mathcal{P}}$ and P using (16)
 14:    end if
 15:    Set p $\leftarrow$ p + 1
 16: end while
 17: Set $\mathcal{P}(l) \leftarrow \bar{\mathcal{P}}$

---

III. APPENDIX—EXAMPLES

A number of illustrative examples are presented in this section for better understanding of the proposed method.
Example 1: Consider n=3, m=2, c=[3 3], d=[2 2 2], and $$T = \begin{bmatrix} 5 & 6 \\ 3 & 2 \\ 7 & 8 \end{bmatrix}$$

Note that total RBs demand for all UEs is $\bar{d}=2+2+2=6$, whereas the total RBs supply by all the CTs equals $\bar{c}=3+3=6$. As a result, we potentially have all the required resource-blocks to completely address all the three UEs at the same time. However, one out of the three UEs will inevitably be forced to use 1 RB out of first CT and 1 RB out of second CT in order to meet the requirement of 2 RBs for that particular UE. Since sharing more than one CT by a single UE as explained does not result in a valid assignment for that particular UE, it renders one out of the three UEs not successfully assigned for this example. The goal is to find the optimal UE-CT Assignment with the least possible total cost while satisfying the aforementioned constraints using the maximum RBs supplies provided by the CTs. To this end, let first highlight the first and second columns of T, corresponding to the first and second CTs, by red (on the left) and blue (on the right) colors as follows $$T = \begin{bmatrix} 5 & 6 \\ 3 & 2 \\ 7 & 8 \end{bmatrix}$$

In first pre-processing step, we establish cost matrix $\tilde{T} \in \mathbb{R}^{\tilde{d} \times m}$ by copying the $i^{th}$ row of T for $d_i$ times for every i$\in \mathcal{A}$, which results in $$\tilde{T} = \begin{bmatrix} 5 & 6 \\ 5 & 6 \\ 3 & 2 \\ 3 & 2 \\ 7 & 8 \\ 7 & 8 \end{bmatrix}$$

In second pre-processing step, we establish the cost matrix $\overline{T} \in \mathbb{R}^{\tilde{d} \times \bar{c}}$ by copying the $j^{th}$ column of $\tilde{T}$ for $c_j$ times for every j$\in \mathcal{B}$, which results in $$\bar{T} = \begin{bmatrix} 5 & 5 & 5 & 6 & 6 & 6 \\ 5 & 5 & 5 & 6 & 6 & 6 \\ 3 & 3 & 3 & 2 & 2 & 2 \\ 3 & 3 & 3 & 2 & 2 & 2 \\ 7 & 7 & 7 & 8 & 8 & 8 \\ 7 & 7 & 7 & 8 & 8 & 8 \end{bmatrix}$$

Note that since we do not have any Surplus or Deficit of RBs in this example ($\bar{c}=\bar{d}=\bar{r}:=\max\{\bar{c},\bar{d}\}$), we perform the third pre-processing step by simply generating $\hat{T} \in \mathbb{R}^{\bar{r} \times \bar{r}}$ as $\hat{T}=\bar{T}$, and use the Customized Hungarian method to solve the transformed Min-Sum Assignment challenge. This results in the following optimal assignment vector $$\hat{M}^* = [\,2'\quad 3'\quad 5'\quad 6'\quad 4'\quad 1'\,]$$

which is demonstrated as follows for better visualization $$\begin{bmatrix} 5 & ⑤ & 5 & 6 & 6 & 6 \\ 5 & 5 & ⑤ & 6 & 6 & 6 \\ 3 & 3 & 3 & 2 & ② & 2 \\ 3 & 3 & 3 & 2 & 2 & ② \\ 7 & 7 & 7 & ⑧ & 8 & 8 \\ ⑦ & 7 & 7 & 8 & 8 & 8 \end{bmatrix}$$

After first post-processing step for which $\bar{M}^*=\hat{M}^*$, the second post-processing step is performed by reversing the impact of second pre-processing transformation and forming the optimal assignment vector $\tilde{M}^*$ as follows $$\tilde{M}^* = [\,1\quad 1\quad 2\quad 2\quad 2\quad 1\,]$$

It follows from $\tilde{M}^*$ that 2 demanded RBs of first UE are provided by the first CT, 2 demanded RBs of the second UE are supplied by the second CT, whereas one RB of third UE is provided by the second CT and another RB of the third UE is supplied by the first CT. Note that the above description makes the first UE assigned to the first CT and the second UE assigned to the second CT. However, the assignment of the third UE is invalid since it violates a previously-described constraint where all the RB demands of a single UE should be supplied by just one single CT (the RB demands of a UE cannot be shared between more than one CTs). By reversing the first pre-processing transformation, the final optimal assignment M* is obtained as $$M^* = [\,1\quad 2\quad 0\,]$$

indicating that the third UE remains unassigned. Moreover, the final optimal assignment with minimum total cost value of $z^*=2(5)+2(2)=14$ is depicted by a square box over the elements of the cost matrix below $$\begin{bmatrix} ⑤ & 6 \\ 3 & ② \\ 7 & 8 \end{bmatrix}$$

Example 2: Consider n=3, m=2, c=[3 2], d=[2 2 2], and $$T = \begin{bmatrix} 5 & 6 \\ 3 & 2 \\ 7 & 8 \end{bmatrix}$$

Note that the total RBs demand for all UEs is $\bar{d}=2+2+2=6$ while the total available RBs provided by CTs is $\bar{c}=3+2=5$. Since $\bar{c}<\bar{d}$, we are facing a shortage in available RBs compared to the total demanded RBs which puts us in the RBs Deficit scenario. The goal is to find the optimal UE-CT Assignment with the least possible total cost while satisfying the aforementioned constraints using all the RBs provided by the CTs. To this end, let highlight the first and second columns of T, corresponding to the first and second CTs, by red (on the left) and blue (on the right) colors as follows $$T = \begin{bmatrix} 5 & 6 \\ 3 & 2 \\ 7 & 8 \end{bmatrix}$$

Note that the first pre-processing and second pre-processing steps will be similar to Example 1, which results in $\bar{T} \in \mathbb{R}^{\bar{d} \times \bar{c}}$ shown below $$\bar{T} = \begin{bmatrix} 5 & 5 & 5 & 6 & 6 \\ 5 & 5 & 5 & 6 & 6 \\ 3 & 3 & 3 & 2 & 2 \\ 3 & 3 & 3 & 2 & 2 \\ 7 & 7 & 7 & 8 & 8 \\ 7 & 7 & 7 & 8 & 8 \end{bmatrix}$$

Since we are in RB Deficit scenario in this example ($\bar{c}<\bar{d}$), we perform the third pre-processing step by adding $\bar{d}-\bar{c}=1$ zero column vector $0_{\bar{d}\times 1}$ to the far right-hand side of matrix $\bar{T}$ in order to build $\hat{T} \in \mathbb{R}^{\bar{r} \times \bar{r}}$, $\bar{r}:=\max\{\bar{c},\bar{d}\}=6$, as follows $$\hat{T} = \begin{bmatrix} 5 & 5 & 5 & 6 & 6 & 0 \\ 5 & 5 & 5 & 6 & 6 & 0 \\ 3 & 3 & 3 & 2 & 2 & 0 \\ 3 & 3 & 3 & 2 & 2 & 0 \\ 7 & 7 & 7 & 8 & 8 & 0 \\ 7 & 7 & 7 & 8 & 8 & 0 \end{bmatrix}$$

Then, we are allowed to use Customized Hungarian method to solve the transformed Min-Sum Assignment challenge, which results in the following optimal assignment vector $$\hat{M}^* = [\,2'\quad 3'\quad 4'\quad 5'\quad 6'\quad 1'\,]$$

Moreover, $\hat{M}^*$ is demonstrated as follows for better visualization $$\begin{bmatrix} 5 & ⑤ & 5 & 6 & 6 & 0 \\ 5 & 5 & ⑤ & 6 & 6 & 0 \\ 3 & 3 & 3 & ② & 2 & 0 \\ 3 & 3 & 3 & 2 & ② & 0 \\ 7 & 7 & 7 & 8 & 8 & ⓪ \\ ⑦ & 7 & 7 & 8 & 8 & 0 \end{bmatrix}$$

In the first post-processing step, the impact of the changes performed in the third pre-processing step is reversed by forming the optimal assignment vector $\overline{M}^*$ as follows $$\overline{M}^* = [\,2'\ \ 3'\ \ 4'\ \ 5'\ \ 0\ \ 1'\,]$$

Then, we reverse the impact of second pre-processing step by forming the optimal assignment $\tilde{M}^*$ in second post-processing step as follows $$\tilde{M}^* = [\,1\ \ 1\ \ 2\ \ 2\ \ 0\ \ 1\,]$$

It follows from $\tilde{M}^*$ that 2 demanded RBs of the first UE are supplied by the first CT, 2 required RBs of the second UE are supplied by the second CT, whereas only one of the demanded RB of the third UE is provided by the first CT while we are facing shortage of resource-blocks for the other RB of the third UE. This description makes the first UE assigned to the first CT and the second UE assigned to the second CT. However, the assignment of the third UE is invalid since we fail to provide all the required RBs for the third UE due to shortage in available RBs. By reversing the transformation made in first pre-processing step, the final optimal assignment M* is obtained in the third post-processing step as follows $$M^* = [\,1\ \ 2\ \ 0\,]$$

indicating that the third UE remains unassigned. Moreover, the final optimal assignment with minimum total cost value of $z^* = 2(5) + 2(2) = 14$ is depicted by a square box over the elements of the cost matrix below $$\begin{bmatrix} \boxed{5} & 6 \\ 3 & \boxed{2} \\ 7 & 8 \end{bmatrix}$$

Example 3: Consider n=3, m=3, c=[3 3 2], d=[2 3 2], and $$T = \begin{bmatrix} 5 & 6 & 1 \\ 3 & 2 & 4 \\ 7 & 8 & 4 \end{bmatrix}$$

Note that $\overline{c}=8$ and $\overline{d}=7$, which results in RB Surplus scenario for this example (the supply of RBs is larger than the demand for them). In first pre-processing step, $\tilde{T} \in \mathbb{R}^{\overline{d} \times m}$ is formed as follows $$\tilde{T} = \begin{bmatrix} 5 & 6 & 1 \\ 5 & 6 & 1 \\ 3 & 2 & 4 \\ 3 & 2 & 4 \\ 3 & 2 & 4 \\ 7 & 8 & 4 \\ 7 & 8 & 4 \end{bmatrix}$$

In second pre-processing step, $\overline{T} \in \mathbb{R}^{\overline{d} \times \overline{c}}$ is formed as follows $$\overline{T} = \begin{bmatrix} 5 & 5 & 5 & 6 & 6 & 6 & 1 & 1 \\ 5 & 5 & 5 & 6 & 6 & 6 & 1 & 1 \\ 3 & 3 & 3 & 2 & 2 & 2 & 4 & 4 \\ 3 & 3 & 3 & 2 & 2 & 2 & 4 & 4 \\ 3 & 3 & 3 & 2 & 2 & 2 & 4 & 4 \\ 7 & 7 & 7 & 8 & 8 & 8 & 4 & 4 \\ 7 & 7 & 7 & 8 & 8 & 8 & 4 & 4 \end{bmatrix}$$

In third pre-processing step, $\hat{T} \in \mathbb{R}^{\overline{r} \times \overline{r}}$, $\overline{r} := \max\{\overline{c}, \overline{d}\} = 8$, is formed by adding $\overline{c} - \overline{d} = 1$ zero row vector $0_{\overline{c} \times 1}$ to the bottom of matrix $\overline{T}$ as follows $$\hat{T} = \begin{bmatrix} 5 & 5 & 5 & 6 & 6 & 6 & 1 & 1 \\ 5 & 5 & 5 & 6 & 6 & 6 & 1 & 1 \\ 3 & 3 & 3 & 2 & 2 & 2 & 4 & 4 \\ 3 & 3 & 3 & 2 & 2 & 2 & 4 & 4 \\ 3 & 3 & 3 & 2 & 2 & 2 & 4 & 4 \\ 7 & 7 & 7 & 8 & 8 & 8 & 4 & 4 \\ 7 & 7 & 7 & 8 & 8 & 8 & 4 & 4 \\ 0 & 0 & 0 & 0 & 0 & 0 & 0 & 0 \end{bmatrix}$$

By applying the Customized Hungarian method, we solve the transformed version of the Min-Sum Assignment challenge resulting in the following optimal assignment $$\hat{M}^* = [\,7'\ \ 8'\ \ 4'\ \ 5'\ \ 6'\ \ 2'\ \ 1'\ \ 3'\,]$$

which is demonstrated as follows for better visualization $$\begin{bmatrix} 5 & 5 & 5 & 6 & 6 & 6 & \textcircled{1} & 1 \\ 5 & 5 & 5 & 6 & 6 & 6 & 1 & \textcircled{1} \\ 3 & 3 & 3 & \textcircled{2} & 2 & 2 & 4 & 4 \\ 3 & 3 & 3 & 2 & \textcircled{2} & 2 & 4 & 4 \\ 3 & 3 & 3 & 2 & 2 & \textcircled{2} & 4 & 4 \\ 7 & \textcircled{7} & 7 & 8 & 8 & 8 & 4 & 4 \\ \textcircled{7} & 7 & 7 & 8 & 8 & 8 & 4 & 4 \\ 0 & 0 & \textcircled{0} & 0 & 0 & 0 & 0 & 0 \end{bmatrix}$$

By applying the first post-processing step, $\overline{M}^*$ is formed as $$\overline{M}^* = [\,7'\ \ 8'\ \ 4'\ \ 5'\ \ 6'\ \ 2'\ \ 1'\,]$$

In second post-processing step, $\tilde{M}^*$ is formed as $$\tilde{M}^* = [\,3\ \ 3\ \ 2\ \ 2\ \ 2\ \ 1\ \ 1\,]$$

It follows from $\tilde{M}^*$ that 2 RBs of first UE are supplied by the third CT, 3 RBs of the second UE are supplied by the second CT, and 2 RBs of the third UE are provided by the first CT. Note also that one RB of the first CT remains unassigned due to surplus of available RBs. The above description results in final optimal assignment M* in third post-processing step as follows

US 12,621,810 B2

19

$$M^* = [3 \quad 2 \quad 1]$$

Moreover, the final optimal assignment with minimum total cost value of z*=2(1)+3(2)+2(7)=22 is depicted by a square box over the elements of the cost matrix below $$\begin{bmatrix} 5 & 6 & \boxed{1} \\ 3 & \boxed{2} & 4 \\ \boxed{7} & 8 & 4 \end{bmatrix}$$

Example 4: A simple example is presented to demonstrate how the core procedure used in Customized Hungarian method works. To this end, consider n=3, m=3, c=[1 1 1], d=[1 1 1], and $$T = \begin{bmatrix} 5 & 6 & 1 \\ 3 & 2 & 4 \\ 7 & 8 & 4 \end{bmatrix}$$

to formulate a Min-Sum Assignment challenge in its most basic form, which results in $\check{\mathcal{A}}=\{1,2,3\}$, $\hat{\mathcal{B}}=\{1',2',3'\}$, and $\hat{T}=T$. At l=0 and for initialization according to Algorithms 1 and 2, {u(0), v(0)}, $\check{T}(0)$, $\check{M}(0)$ and $\check{\mathcal{A}}(0)$ are obtained as follows $$u(0) = [1 \quad 2 \quad 4], \tag{18a}$$

$$v(0) = [1 \quad 0 \quad 0], \tag{18b}$$

$$\check{T}(0) = \begin{bmatrix} 3 & 5 & 0 \\ 0 & 0 & 2 \\ 2 & 4 & 0 \end{bmatrix} \tag{18c}$$

$$\check{M}(0) = [3' \quad 1' \quad 0], \tag{18d}$$

$$\check{\mathcal{A}}(0) = \{3\} \tag{18e}$$

Figure 4:
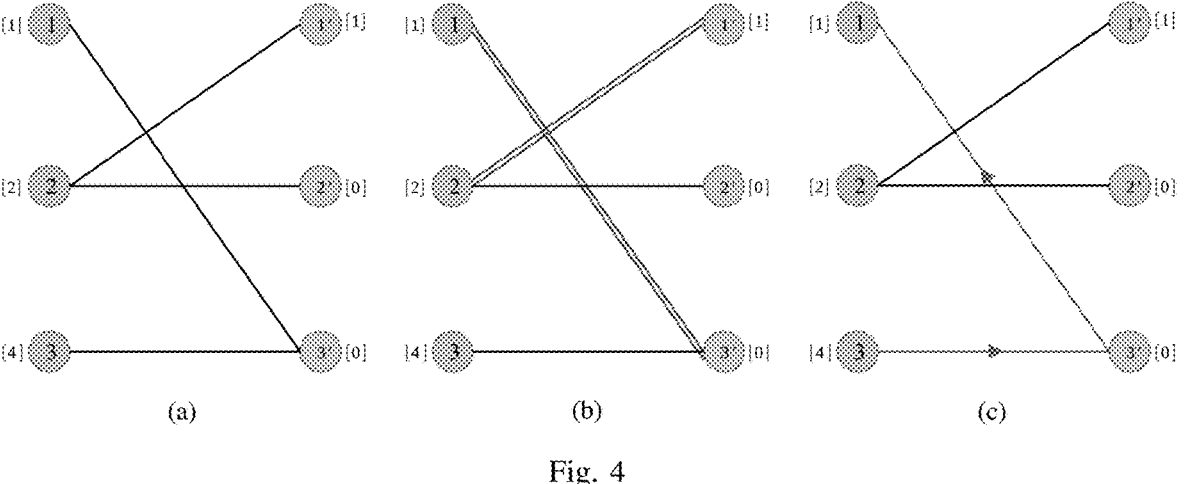
FIG. 4 is a nodal representation of a Reduced Bipartite graph in accordance with the teachings of the present invention.

The resulting Reduced Bipartite graph $\check{G}(0)$ is depicted in FIG. 4a whereas its corresponding assignment $\check{M}(0)$ is shown by red edges (double lines) in FIG. 4b. The next task is to find the Augmenting-Path $\mathcal{P}(0)$ which starts from Free UE 3 and ends in Free CT 2'. To this end, we enter the inner while-loop and we obtain $\bar{\mathcal{P}}=\{(3,3'), (3',1)\}$ after one FWD case in p=0, which is depicted by green edges (arrowed lines) in FIG. 4c. Since we hit a dead-end, we then have a BTR case in p=1 and finally we end up with a DPU case in p=2. By updating the Intermediate Dual-Pair, new values of {$\bar{u}$, $\bar{v}$} and R in p=2 are obtained as $$\bar{u} = [3 \quad 2 \quad 6], \tag{19a}$$

$$\bar{v} = [1 \quad 0 \quad -2], \tag{19b}$$

$$R = \begin{bmatrix} 1 & 3 & 0 \\ 0 & 0 & 4 \\ 0 & 2 & 0 \end{bmatrix} \tag{19c}$$

20

This results in a new topology for Reduced Bipartite Graph for the same assignment $\check{M}(0)$, which is depicted in FIG. 3a. By continuing the inner while-loop, we encounter FWD case in p=3, and finally end up with APF case in p=4. This results in $\bar{\mathcal{P}}=\{(3, 1'), (1',2), (2, 2')\}=\mathcal{P}(0)$ as the desired Augmenting-Path. Note that $\mathcal{P}(0)$ is depicted by green edges (arrowed lines) in FIG. 3b, which results in the following updates $$u(1) = [3 \quad 2 \quad 6], \tag{20a}$$

$$v(1) = [1 \quad 0 \quad -2], \tag{20b}$$

$$\check{T}(1) = \begin{bmatrix} 1 & 3 & 0 \\ 0 & 0 & 4 \\ 0 & 2 & 0 \end{bmatrix} \tag{20c}$$

$$\check{M}(1) = [3' \quad 2' \quad 1'], \tag{20d}$$

$$\check{\mathcal{A}}(1) = \phi \tag{20e}$$

Since $\check{\mathcal{A}}(1)$ is an empty set, the main while-loop breaks signifying that the optimal assignment M*=[3' 2' 1'] has been achieved (it is depicted by red edges (double lines) in FIG. 3c). Moreover, M* is visualized using a square box over the elements of the original cost matrix as follows

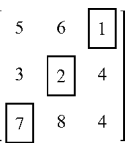

What is claimed is:

1. A method for determining an assignment of Resource Blocks (RBs) from one or more Cell Tower (CTs) to a plurality of User Equipment devices (UEs), the assignment minimizing a total assignment cost, the method comprising:
    modifying a system of equations by introducing a plurality of dummy UEs therein, the system of equations being defined using a cost matrix, a RB-Supply vector and a RB-Demand vector;
    modifying the system of equations by introducing one or more dummy CTs therein;
    resolving the system of equations using a Customized Hungarian method;
    reversing the modification made by introducing the dummy CTs; and
    reversing the modification made by introducing the dummy UEs, thereby obtaining the assignment;
    following the reversing of the modification made by introducing the dummy UEs, verifying that the obtained assignment meets constraint of each of the UEs being assigned to one of the CTs if and only if all requirement for the RBs for at least one of the given UEs are supplied by available RBs of the one of the CTs; and
    transmitting, via a network interface of the network node, control information to the one or more CTs that causes allocation of RBs to the plurality of UEs in accordance with the obtained assignment.

2. The method of claim 1 further comprising, following the introduction of dummy CTs, modifying the system of equations to obtain a resolvable system.

3. An apparatus for determining an assignment of Resource Blocks (RBs) from one or more Cell Tower (CTs) to a plurality of User Equipment devices (UEs) comprising:

a network interface; and one or more processors configured to:

modify a system of equations by introducing a plurality of dummy UEs therein, the system of equations being defined using a cost matrix, a RB-Supply vector and a RB-Demand vector;

modify the system of equations by introducing one or more dummy CTs therein; resolve the system of equations using a Customized Hungarian method;

reverse the modification made by introducing the dummy CTs; and reverse the modification made by introducing the dummy UEs, thereby obtaining the assignment;

following the reversing of the modification made by introducing the dummy UEs, verify that the obtained assignment meets constraint of each of the UEs being assigned to one of the CTs if and only if all requirement for the RBs for any at least one of the given UEs are supplied by available RBs of the one of the CTs; and transmit, via the network interface, control information to the one or more CTs that causes allocation of RBs to the plurality of UEs in accordance with the obtained assignment.

4. The apparatus of claim 3, wherein the one or more processors are further configured to, following the introduction of dummy CTs, modify the system of equations to obtain a resolvable system.

\* \* \* \* \*